United States Patent
Kim (10) Patent No.: US 9,219,935 B2
(45) Date of Patent: Dec. 22, 2015

(54) DISPLAY APPARATUS, EXTERNAL PERIPHERAL DEVICE CONNECTABLE THERETO AND IMAGE DISPLAYING METHOD

(71) Applicant: SAMSUNG ELECTRONICS CO., LTD., Suwon-si (KR)

(72) Inventor: Je-ik Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 13/654,964

(22) Filed: Oct. 18, 2012

(65) Prior Publication Data

US 2013/0169866 A1    Jul. 4, 2013

(30) Foreign Application Priority Data

Dec. 30, 2011    (KR) ........................ 10-2011-0147719

(51) Int. Cl.
| | |
|---|---|
| G06F 13/12 | (2006.01) |
| G06F 13/38 | (2006.01) |
| H04N 21/41 | (2011.01) |
| H04N 21/431 | (2011.01) |
| H04N 21/44 | (2011.01) |
| H04N 21/462 | (2011.01) |
| G06F 3/14 | (2006.01) |
| H04N 21/418 | (2011.01) |

(52) U.S. Cl.
CPC .............. *H04N 21/4104* (2013.01); *G06F 3/14* (2013.01); *H04N 21/4184* (2013.01); *H04N 21/4318* (2013.01); *H04N 21/44012* (2013.01); *H04N 21/4622* (2013.01); *G09G 2370/20* (2013.01)

(58) Field of Classification Search
None
See application file for complete search history.

(56) References Cited

U.S. PATENT DOCUMENTS

| | | | |
|---|---|---|---|
| 5,880,789 A * | 3/1999 | Inaba ............................ | 725/137 |
| 5,907,715 A | 5/1999 | Stoel et al. | |
| 6,519,771 B1 | 2/2003 | Zenith | |
| 6,621,499 B1 | 9/2003 | Callway | |
| 7,173,667 B2 * | 2/2007 | Oh ................................ | 348/468 |
| 7,307,667 B1 | 12/2007 | Yeh et al. | |
| 7,313,805 B1 | 12/2007 | Rosin et al. | |
| 7,425,992 B2 | 9/2008 | Feeler et al. | |
| 7,548,242 B1 | 6/2009 | Hughes et al. | |
| 7,631,277 B1 | 12/2009 | Nie et al. | |
| 7,840,979 B2 | 11/2010 | Poling, Jr. et al. | |
| 7,969,474 B2 * | 6/2011 | Lewis ......................... | 348/222.1 |
| 8,176,515 B2 | 5/2012 | Ahmad et al. | |
| 2001/0016947 A1 | 8/2001 | Nishikawa et al. | |
| 2003/0079224 A1 * | 4/2003 | Komar et al. .................... | 725/32 |
| 2005/0086702 A1 * | 4/2005 | Cormack et al. .............. | 725/135 |

(Continued)

OTHER PUBLICATIONS

Communication dated Nov. 22, 2013 issued by the United States Patent and Trademark Office in counterpart U.S. Appl. No. 13/716,906.

(Continued)

*Primary Examiner* — Elias Mamo
(74) *Attorney, Agent, or Firm* — Sughrue Mion, PLLC (57) ABSTRACT

A display apparatus, an external peripheral device connectable thereto and an image displaying method. The display apparatus includes a video receiver which receives a video signal; a display unit which displays an image; and a peripheral device connector which includes a first port to transmit and receive a video signal and a second port to receive a video signal, both of which are connected to the external peripheral device.

21 Claims, 7 Drawing Sheets

(56) References Cited

U.S. PATENT DOCUMENTS

| | | |
|---|---|---|
| 2006/0253874 A1 | 11/2006 | Stark et al. |
| 2008/0084834 A1 | 4/2008 | Stanek et al. |
| 2008/0148335 A1* | 6/2008 | Dawson et al. ............... 725/132 |
| 2009/0177556 A1 | 7/2009 | Matsuo |
| 2009/0180025 A1 | 7/2009 | Dawson |
| 2010/0162319 A1 | 6/2010 | Piepenbrink et al. |
| 2010/0245667 A1 | 9/2010 | Hardacker et al. |
| 2010/0325667 A1 | 12/2010 | Lee et al. |
| 2011/0247044 A1* | 10/2011 | Jacoby ........................ 725/115 |
| 2011/0271296 A1* | 11/2011 | Tu et al. ......................... 725/25 |
| 2013/0159571 A1* | 6/2013 | Olson .............................. 710/74 |

OTHER PUBLICATIONS

Communication dated Jul. 30, 2014, issued by the European Patent Office in counterpart European Application No. 12198549.3.

Communication issued on Aug. 19, 2015 by the European Patent Office in related Application No. 12198549.3.

\* cited by examiner

DISPLAY APPARATUS, EXTERNAL PERIPHERAL DEVICE CONNECTABLE THERETO AND IMAGE DISPLAYING METHOD

CROSS-REFERENCE TO RELATED APPLICATION

This application claims the benefit of priority from Korean Patent Application No. 10-2011-0147719, filed on Dec. 30, 2011 in the Korean Intellectual Property Office, the disclosure of which is incorporated herein by reference in its entirety.

BACKGROUND

1. Technical Field

Apparatuses and methods consistent with exemplary embodiments relate to displaying content, and more particularly, to a display apparatus, an external peripheral device connectable thereto and an image displaying method thereof.

2. Description of the Related Art

Most TVs have a function of receiving and playing a broadcasting signal. As a result of rapid development of technology, hardware of AV devices such as TVs are upgraded rapidly and software are also equipped with new functions. However, a display apparatus which is an expensive device such as TVs may not provide an upgraded function for five to seven years until a user purchases a new display apparatus.

As a result, existing TVs may not provide a function of playing a video, a function of receiving and executing a game image supplied by another image source or a function of searching and displaying information in real time through a network such as the Internet unless there is a new device such as a smart TV.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

Accordingly, one or more exemplary embodiments provide a display apparatus and an image displaying method thereof which displays a graphic signal which may be displayed together with a video signal by using an external peripheral device.

Another exemplary embodiment is to provide a display apparatus and an image displaying method which displays a graphic signal overlapping a video signal by using an external peripheral device without modification of the hardware.

Still another exemplary embodiment is to provide an external peripheral device and an image processing method thereof which synthesizes an HD signal and a graphic signal for output.

Still another exemplary embodiment is to provide an external peripheral device and an image displaying method thereof which processes a video signal supplied by a display apparatus and transmits the processed video signal back to the display apparatus.

The foregoing and/or other aspects may be achieved by providing a display apparatus including: a video receiver which receives a video signal; a peripheral device connector which includes a first port to transmit and receive a video signal, which is connected to an external peripheral device that processes the video signal to be displayed by the display apparatus.

The first port may include one of a USB interface and a PCI express interface, and the second port may include one of an HDMI and a DVI. The display apparatus may further include a display unit which displays the processed video signal and a second port including one of an HDMI and a DVI, and where a video signal which is compressed into a digital signal may be transmitted to the external peripheral device through the first port, and a decompressed video signal may be transmitted by the external peripheral device through the second port.

A synthesized signal which includes a graphic signal that relates to contents of the video signal, and is displayed by the display unit together with the video signal to form the processed video signal and where the synthesized signal may be transmitted by the external peripheral device via the second port.

The video receiver may include at least one of a digital broadcasting receiver to receive a digital broadcasting signal, an analog broadcasting receiver to receive an analog broadcasting signal, an Ethernet interface, a digital video receiver to receive a digital video signal, an analog video receiver to receive an analog video signal, and a USB interface.

The video receiver may further include an analog receiver to receive an analog video signal, and a bit stream encoder to encode the analog video signal into a digital video signal.

The display apparatus may further include a video processor which synthesizes a video signal with a graphic signal to form the synthesized signal, where the video processor synthesizes the synthesized signal and at least one of channel information, a subtitle and a teletext.

The foregoing and/or other aspects may be achieved by providing a display apparatus including: a video receiver which receives a video signal; a peripheral device connector which is connected to an external peripheral device; and a controller which controls the peripheral device connector to output the video signal to the external peripheral device, and controls the peripheral device connector to receive a synthesis signal including a graphic signal from the external peripheral device to be displayed by the display apparatus.

The display apparatus may further include a video processor which synthesizes the video signal and the graphic signal, where the controller controls the video processor to synthesize the synthesis signal and at least one of channel information, a subtitle and a teletext.

The display apparatus may further include an MPEG encoder which converts an analog broadcasting signal into a digital signal upon receiving the analog broadcasting signal from the video receiver, wherein the controller controls the peripheral device connector to output the converted digital signal to the external peripheral device.

The video receiver may include at least one of a digital broadcasting receiver to receive a digital broadcasting signal, an analog broadcasting receiver to receive an analog broadcasting signal, an Ethernet interface, a digital video receiver to receive a digital video signal, an analog video receiver to receive an analog video signal, and a USB interface.

The peripheral device connector may include a first port including one of a USB interface and a PCI express interface, and a second port including one of a high definition multimedia interface (HDMI) and a digital visual interface (DVI), and where a video signal which is compressed into a digital signal is transmitted to the external peripheral device via the first port, and a decompressed video signal is transmitted by the external peripheral device via the second port.

The foregoing and/or other aspects may be achieved by providing an image displaying method of a display apparatus, which includes: receiving a video signal by the display apparatus; outputting the video signal to an external peripheral device connected to the display apparatus; receiving by the display apparatus a synthesis signal including a graphic signal from the external peripheral device; and displaying the received synthesis signal by the display apparatus.

The receiving the synthesis signal may include receiving at least one of a digital broadcasting signal, an analog broadcasting signal, a digital video signal and an analog video signal.

The method may further include synthesizing the synthesis signal and at least one of channel information, a subtitle, and a teletext.

The receiving the synthesis signal may include receiving an analog broadcasting signal, and further including converting the analog broadcasting signal into a digital signal.

The foregoing and/or other aspects may be achieved by providing an external peripheral device which is connected to a display apparatus including: a display apparatus connector which includes a first port to transmit and receive a video signal and which is connected to the display apparatus; and a video processor which decodes a video signal input via the display apparatus connector and performs a predetermined upgrade function for the video signal.

The display apparatus connector may further include a second port to transmit the video signal. The first port may include one of a USB interface and a PCI express interface, and the second port may include one of an HDMI and a DVI, and where a video signal which is compressed into a digital signal is transmitted by the display apparatus via the first port, and a decompressed video signal is transmitted to the display apparatus via the second port.

The external peripheral device may further include an upgrade signal receiver which receives an additional signal that is added to the video signal for performing a predetermined upgrade function.

The upgrade signal receiver may include at least one of an Ethernet interface and a USB interface to receive an image signal related to the video signal.

The video processor may synthesize the video signal and a graphic signal that relates to contents of the video signal, that is displayed together with the video signal, and that overlaps the video signal, the external peripheral device further including a controller which controls the video processor to have the graphic signal overlap the video signal, and controls the display apparatus connector to output a synthesis signal in which the video signal and the graphic signal are synthesized to the display apparatus.

The external peripheral device may further include a video interface which receives a video signal from an external image source, where the video processor synthesizes the graphic signal and another video signal that is input through the video interface, and the controller outputs a synthesis signal in which the video signal and the graphic signal are synthesized to the display apparatus.

The video signal may include a digital video signal which is transmitted by at least one of a set-top box and a blue ray disk.

The foregoing and/or other aspects may be achieved by providing an image displaying method of an external peripheral device connected to a display apparatus, the method including: receiving a video signal which is transmitted by the display apparatus; synthesizing into a synthesis signal the video signal and a graphic signal which relates to contents of the received video signal and which is displayed together with the video signal and overlaps the video signal; and outputting the synthesis signal to the display apparatus.

The method may further include receiving a video signal from an external image source; and synthesizing the graphic signal and the video signal from the external image source.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
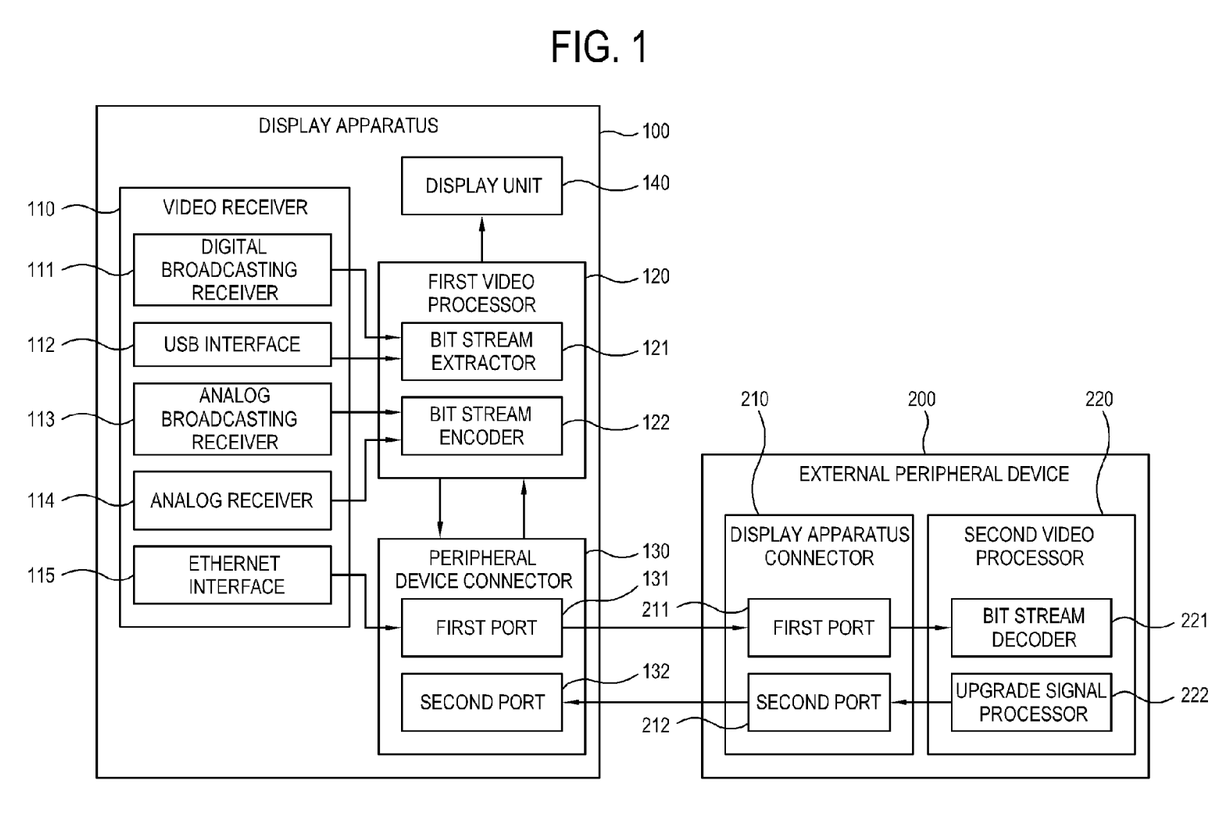
FIG. 1 is a control block diagram illustrating a display apparatus and an external peripheral device according to an exemplary embodiment.

FIG. 1 is a control block diagram illustrating a display apparatus and an external peripheral device according to an exemplary embodiment.

As shown therein, a display apparatus 100 and an external peripheral device 200 are connected to each other and communicate to transmit and receive an image signal and a control signal there between. The display apparatus 100 includes a video receiver 110, a first video processor 120, a peripheral device connector 130 and a display unit 140. The display apparatus 100 may include a mobile device or a digital TV which receives and displays a video signal such as a broadcasting signal or a device such as an AV device which is connectable to a wired/wireless network. The broadcasting signal may include a digital broadcasting signal, an analog broadcasting signal, a satellite broadcasting signal and a cable broadcasting signal. The display apparatus 100 according to an exemplary embodiment may include a digital television which receives and displays a broadcasting signal and receives various data through a network such as the Internet.

The external peripheral device 200 includes a display apparatus connector 210 and a second video processor 220. The external peripheral device 200 may provide the display apparatus 100 with various image signals to provide functions which may not be provided by the display apparatus 100. For example, the external peripheral device 200 may provide the display apparatus 100 with a game image and a film image so that the display apparatus 100 may play the game image or a video such as a movie other than a broadcasting signal. The external peripheral device 200 may provide data service relating to a broadcasting signal that is currently received and displayed. The external peripheral device 200 may perform a video processing operation that is not performed by the display apparatus 100 and provide such processed video to the display apparatus 100. That is, the external peripheral device 200 may provide various functions which may be provided by a smart TV, beyond an image source such as a DVD, to the display apparatus 100.

The video receiver 110 includes a digital broadcasting receiver 111 to receive a digital broadcasting signal, a universal serial bus (USB) interface 112, an analog broadcasting receiver 113 to receive an analog broadcasting, an analog receiver 114 to receive an analog video signal, and a plurality of signal receivers to receive a video signal like an Ethernet interface 115. The video receiver 110 may include various signal receivers as shown in drawings but such signal receivers are illustrated for explanation and not by way of a limitation. Thus the video receiver 110 may include only a single signal receiver. According to yet another exemplary embodiment, the video receiver 110 may further include a digital receiver such as high definition multimedia interface (HDMI) to which an AV device providing a digital video signal is connectable. If an input video signal includes a raw analog signal, it may be received through the analog receiver 114. If an input video signal includes a compressed digital signal, it may be received through the USB interface 112 and a digital receiver.

As shown therein, a video signal which is input through the Ethernet interface 115 may be output to a first port 131 of the peripheral device connector 130. Among signals supplied to the display apparatus 100, a video signal which is input through the digital broadcasting receiver 111 and the USB interface 112 is input to a bit stream extractor 121 of a first video processor 120; and a video signal which is supplied through the analog broadcasting receiver 113 and the analog receiver 114 is input to a bit stream encoder 122 of the first video processor 120.

As described above, the first video processor 120 includes the bit stream extractor 121 and the bit stream encoder 122, processes an input video signal and outputs the processed video signal to the display unit 140 or to the external peripheral device 200 through the peripheral device connector 130. The first video processor 120 may include various video processing blocks (not shown) to perform demultiplexing, decoding and scaling operations, adjustment of picture quality and improvement of picture quality. The display apparatus 100 may further include a sound processor and a speaker which are not shown.

The bit stream extractor 121 extracts a bit stream from an input digital broadcasting signal or digital video signal and outputs the bit stream to the external peripheral device 200. The digital video signal is a compressed digital video signal according to certain standards and resolutions.

The bit stream encoder 122 encodes an input analog broadcasting signal or an analog video signal into a digital signal. The bit stream encoder 122 may include an MPEG encoder which compresses an input analog signal according to MPEG standards.

The bit stream extractor 121 and the bit stream encoder 122 may correspond to new elements of an exemplary embodiment which were not provided in existing digital TVs. The bit stream extractor 121 and the bit stream encoder 122 may include software and/or hardware.

According to another exemplary embodiment, signals from the analog broadcasting receiver 113 and the analog receiver 114 or a camera signal may be transmitted in a raw state without compression to the external peripheral device 200 through the first port 131 as opposed to the bit stream encoder 122.

The peripheral device connector 130 corresponds to an exemplary interface to which the external peripheral device 200 is connected. As shown therein, the peripheral device connector 130 includes the first port 131 via which a video signal is transmitted to the external peripheral device 200; and a second port 132 via which a video signal is transmitted from the external peripheral device 200 to the display apparatus 100. The first port 131 may include either a USB interface or a PCI express interface, or an interface that may read and write data and replace the USB interface or the PCI express interface. The second port 132 may include a digital interface to transmit a digital signal such as one of HDMI and DVI.

A video signal compressed into a digital signal, control information necessary for transmission and reception of a bit stream, various functional information for controlling a video signal by the display apparatus 100 and other agreed data according to standards may be transmitted and received through the first port 131. A signal which is transmitted through the first port 131 is bandwidth-compressed data or raw data may be transmitted in a predetermined bandwidth. If the first port 131 includes a USB interface, the display apparatus 100 operates as a USB port and the external peripheral device 200 operates as a USB device.

According to another exemplary embodiment, signals (which may include all signals) which are transmitted by the display apparatus 100 to the external peripheral device 200 may be encoded for security of contents. The encoded signal will be processed after being decoded by the external peripheral device 200. That is, an exemplary peripheral device may include a decoder for secure transmission of content.

A video signal which is decompressed through the second port 132 is transmitted to the display apparatus 100. The decompressed video signal means a signal which is decoded and upgraded by the external peripheral device 200 after being output as a compressed video signal by the display apparatus 100.

According to another exemplary embodiment, the video signal which is processed by the external peripheral device 200 may be input to the display apparatus 100 not through the second port 132 but through the first port 131.

The display unit 140 displays thereon a main image such as a received broadcasting signal and a synthesis image synthesizing a main image and a graphic image. The display unit 140 may include a liquid crystal display (LCD) panel including liquid crystal, an organic light emitting diode (OLED) panel including OLED elements or plasma display panel (PDP), a flexible display, a 3D display, etc. The display unit 140 may include a panel driver to drive the panel.

The display apparatus 100 may further include a controller (not shown) to control overall operations of the elements and to control transmission and reception of a video signal. The controller may include a central processing unit (CPU).

The first port 211 of the display apparatus connector 210 may include one of a USB interface and a PCI express interface corresponding to the first port 131 of the display apparatus 100. The second port 212 may include one of HDMI and DVI corresponding to the second port 132 of the display apparatus 100. A signal which is transmitted or received through the first ports 131 and 211 and the second ports 132 and 212 complies with predetermined standards, and detailed description of the signal will be omitted.

The second video processor 220 includes a bit stream decoder 221 to decode a video signal input via the display apparatus connector 210; and an upgrade signal processor 222 to perform a predetermined upgrade operation for a signal. The second video processor 220 decodes a compressed video signal and displays the decoded video signal on the display unit 140, and performs a video processing operation for the decoded video signal to provide a new video signal, instead of the input video signal, to the display apparatus 100. The video processing operation performed by the upgrade signal processor 222 includes a function that is not provided by the display apparatus 100. For example, the upgrade signal processor 222 may process a video signal according to functional information input through the first port 211, or process a video signal according to agreed data as standards. The upgrade signal processor 222 may synthesize a graphic signal and a video signal to provide a synthesis signal synthesizing the video signal and the graphic signal. In particular, if an input video signal includes a video signal received through a camera, the upgrade signal processor 222 may extract an object, recognize a motion of the object and perform an additional graphic processing operation according to the recognized result.

The display apparatus 100 according to an exemplary embodiment may provide various functions using the external peripheral device 200, which functions may involve a video signal, and among others a broadcasting signal. The external peripheral device 200 includes the bit stream decoder 221 and performs a function that has been performed by the display apparatus 100, and performs an upgraded function through the upgrade signal processor 222 and provides the display apparatus 100 with a new video signal.

If a video signal is not transmitted to the external peripheral device 200 through the peripheral device connector 130, the video signal is processed by the first video processor 120 and the processed video signal is displayed on the display unit 140.

Figure 2:
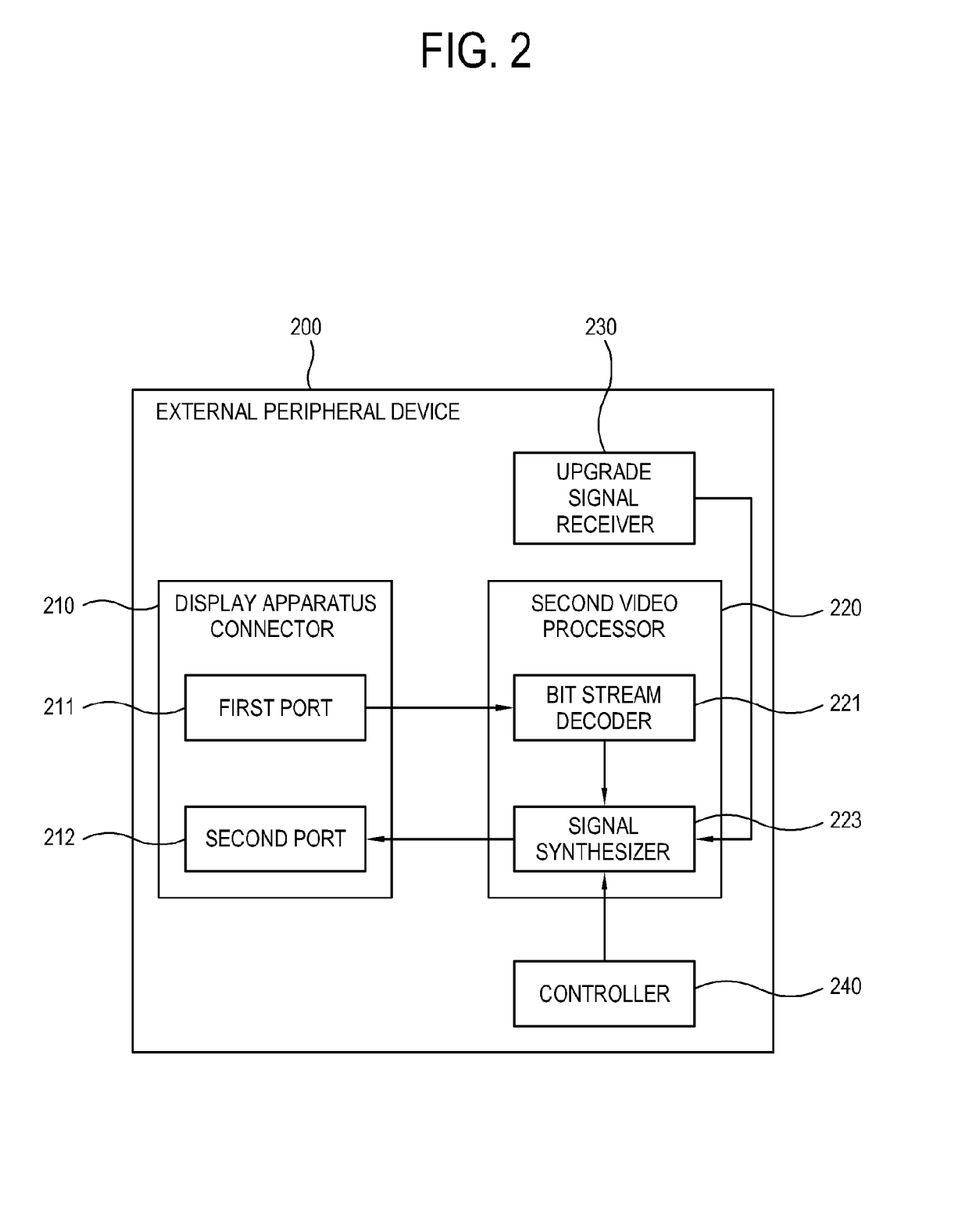
FIG. 2 is a control block diagram illustrating an external peripheral device according to another exemplary embodiment.

FIG. 2 is a control block diagram illustrating an external peripheral device according to another exemplary embodiment.

As shown therein, the external peripheral device 200 further includes an upgrade signal receiver 230 and a controller 240. The upgrade signal receiver 230 may include at least one of an Ethernet interface and a USB interface which receives an additional signal to perform a predetermined upgrade function by being added to an input video signal, and receives an image signal from the outside. For example, if the display apparatus 100 displays a broadcasting signal, a search function relating to a displayed broadcasting signal, real-time data signal or such as an advertisement, program information or a survey relating to a broadcasting program or stock information may be received through the upgrade signal receiver 230. Such information is transmitted to the external peripheral device 200 through a web network such as the Internet and corresponds to data that may not be input to the existing display apparatus 100.

The second video processor 220 includes a signal synthesizer 223 which synthesizes a video signal and a graphic signal that may overlap the video signal and be displayed together with the video signal. The graphic signal may relate to various data or content of a video signal received via the upgrade signal receiver 230. The signal which is synthesized by the signal synthesizer 223 may include a video signal or a graphic signal which has a different layer from a video signal.

The signal synthesizer 223 may include a scaler. The signal synthesizer 223 may include an application program such as a widget.

The controller 240 controls the second video processor 220 to have various data or a graphic signal overlap a video signal, and controls the display apparatus connector 210 to output the synthesis signal synthesizing the video signal and the graphic signal to the display apparatus 100. The controller 240 may include an on screen display (OSD) generator to generate a graphic user interface such as an OSD. The OSD which is generated by the controller 240 may also be synthesized by the signal synthesizer 223 and output to the display apparatus 100. The controller 240 may include a CPU.

Figure 3:
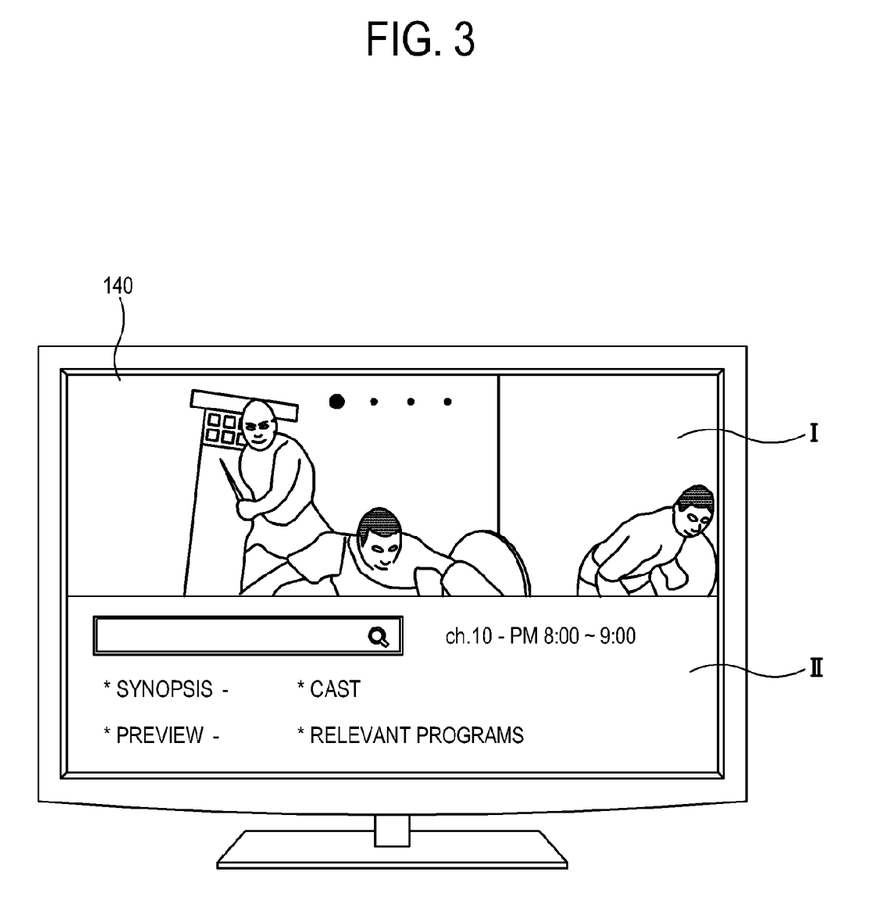
FIG. 3 is a view illustrating a synthesis signal generated by an external peripheral device and displayed by a display apparatus according to an exemplary embodiment.

FIG. 3 is a view illustrating a synthesis signal generated by an external peripheral device and displayed by a display apparatus according to an exemplary embodiment.

Figure 4:
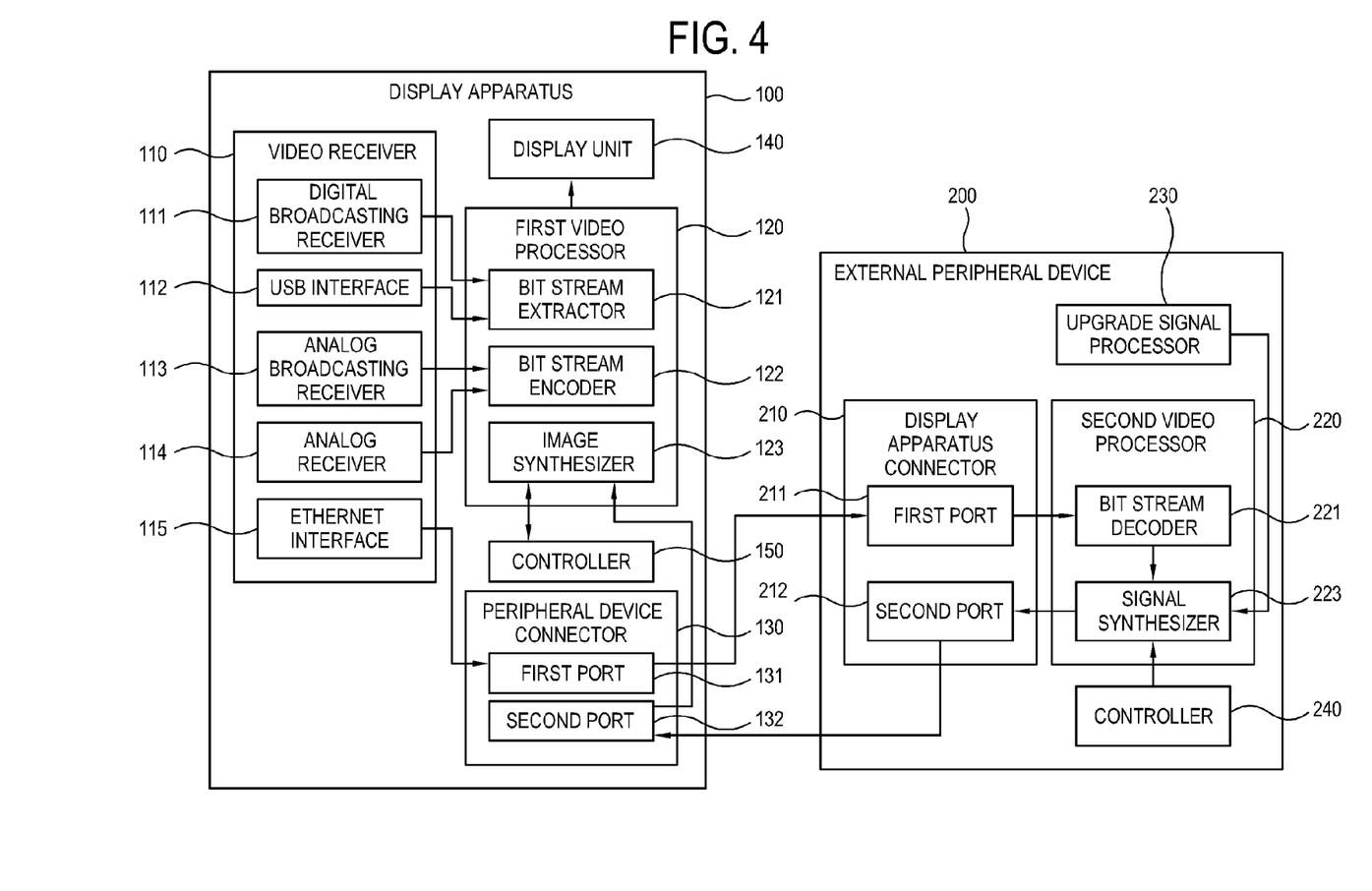
FIG. 4 is a control block diagram illustrating a display apparatus and an external peripheral device according to another exemplary embodiment.

As shown therein, the display unit 140 displays thereon a video signal I and a graphic signal II. A broadcasting signal, a main image, as the video signal I is displayed. As the graphic signal II, a search window for receiving a user's input and data relating to a broadcasting signal (synopsis, cast, preview, relevant programs and channel information) are displayed. The graphic signal II is transmitted by the external peripheral device 200 which is data that may not be provided by the display apparatus 100 by itself. According to an exemplary embodiment, however, the graphic signal II may be transmitted by the external peripheral device 200 and displayed on the display unit 140. A user may use a function that is not supported by the display apparatus 100, by using the image signal synthesized by the signal synthesizer 223 of the external peripheral device 200 shown in FIGS. 1-2. FIG. 4 is a control block diagram illustrating a display apparatus and an external peripheral device according to another exemplary embodiment. As shown therein, the display apparatus 100 further includes a controller 150. The first video processor 120 further includes an image synthesizer 123 to synthesize a video signal and a graphic signal.

The controller 150 controls the peripheral device connector 130 to output a video signal to the external peripheral device 200 and to receive a synthesis signal including a graphic signal from the external peripheral device 200. The controller 150 may include an OSD generator to process a graphic signal such as OSD overlapping an upper part of a video signal, a sub picture and a subtitle, and to generate a graphic user interface (GUI) such as OSD. The controller 150 may include a CPU which is in charge of core control of the display apparatus 100.

The image synthesizer 123 synthesizes a video signal and a graphic signal and outputs the synthesis signal to the display unit 140. The image synthesizer 123 performs alpha blending for synthesizing an image based on transparency information which represents the degree of transparency of an overlapping image. The image synthesizer 123 includes all of known algorithms for synthesizing a video signal and a graphic signal, but not limited to a particular method. The image synthesizer 123 synthesizes a subordinate layer such as a broadcasting signal to a senior layer including a graphic signal such as channel information displaying a channel number and a program title, a subtitle, and a teletext. The image synthesizer 123 may include a scaler or a processing module for adjusting a quality of an image and outputting the image to the display unit 140. The display apparatus 100 according to an exemplary embodiment further adds a graphic signal to a synthesis signal transmitted by the external peripheral device 200.

Figure 5:
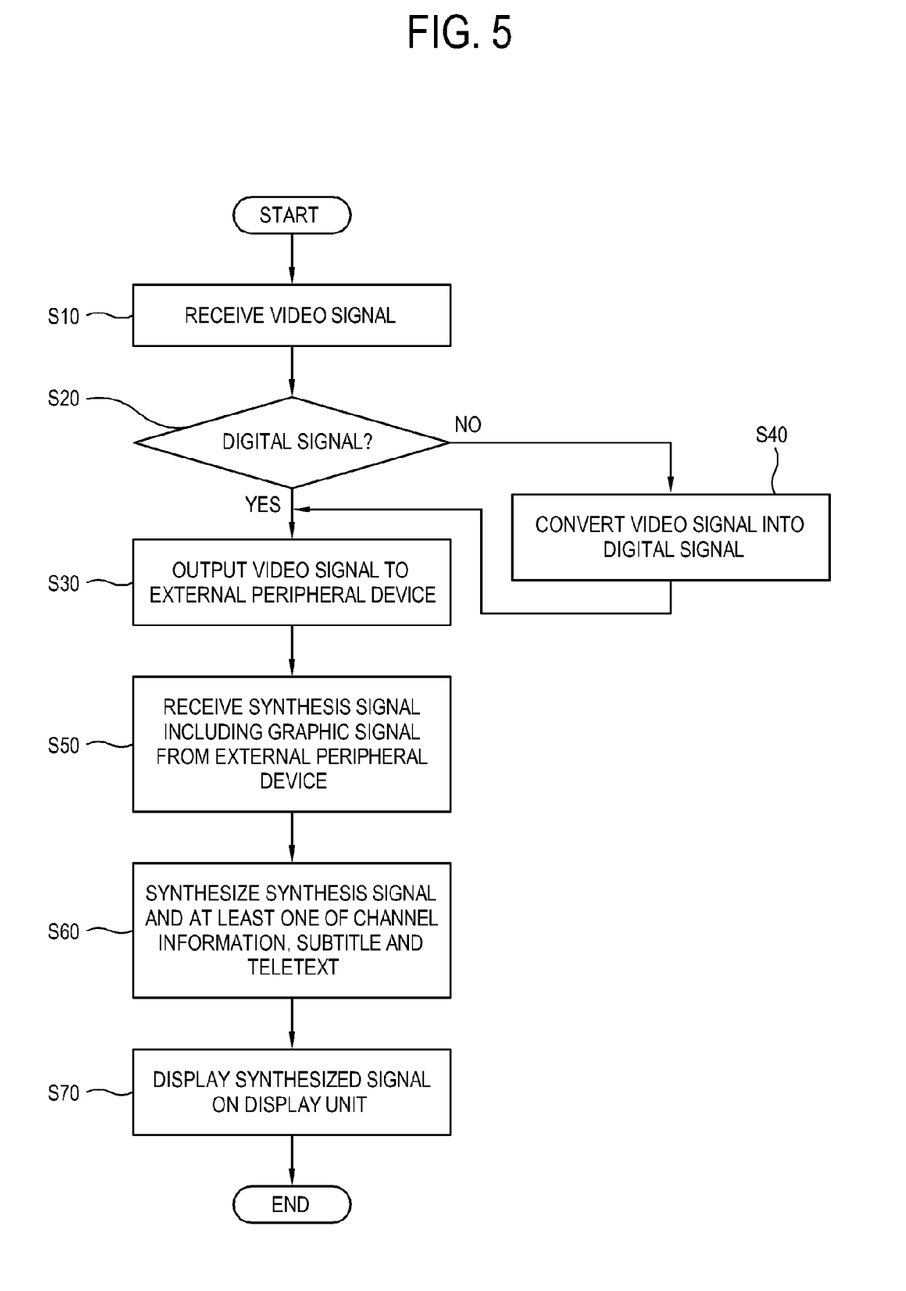
FIG. 5 is a control flowchart illustrating an image displaying method of a display apparatus and an external peripheral device according to an exemplary embodiment.

FIG. 5 is a control flowchart illustrating an image displaying method of the display apparatus and the external peripheral device according to an exemplary embodiment.

The display apparatus 100 receives a video signal via the video receiver 110 (in operation S10). The video receiver 110 may receive at least one of a digital broadcasting signal, an analog broadcasting signal, a digital video signal, and an analog video signal.

If the input video signal is a digital signal (determination may be made in operation S20), the bit stream extractor 121 extracts the bit stream and the display apparatus 100 outputs the bit stream to the external peripheral device 200 through the first port 131 (in operation S30).

If the input video signal is not a digital signal but an analog signal (determination may be made in the operation S20), the bit stream encoder 122 encodes the analog broadcasting signal or the analog video signal into a digital signal (in operation S40). The encoded video signal is output to the external peripheral device 200 (in operation S30).

The external peripheral device 200 may receive an upgrade signal from the outside, process an input video signal in various manners and generate a graphic signal by using the processed image.

The display apparatus 100 receives the synthesis signal including the graphic signal from the external peripheral device 200 (in operation S50).

The display apparatus 100 synthesizes the synthesis signal an at least one of channel information, a subtitle and a teletext (in operation S60).

The image in which the synthesis signal and the graphic signal are synthesized is displayed on the display unit 140 (in operation S70).

The display apparatus 100 may also display a received synthesis signal on the display unit 140 without additional synthesis of the graphic signal.

Figure 6:
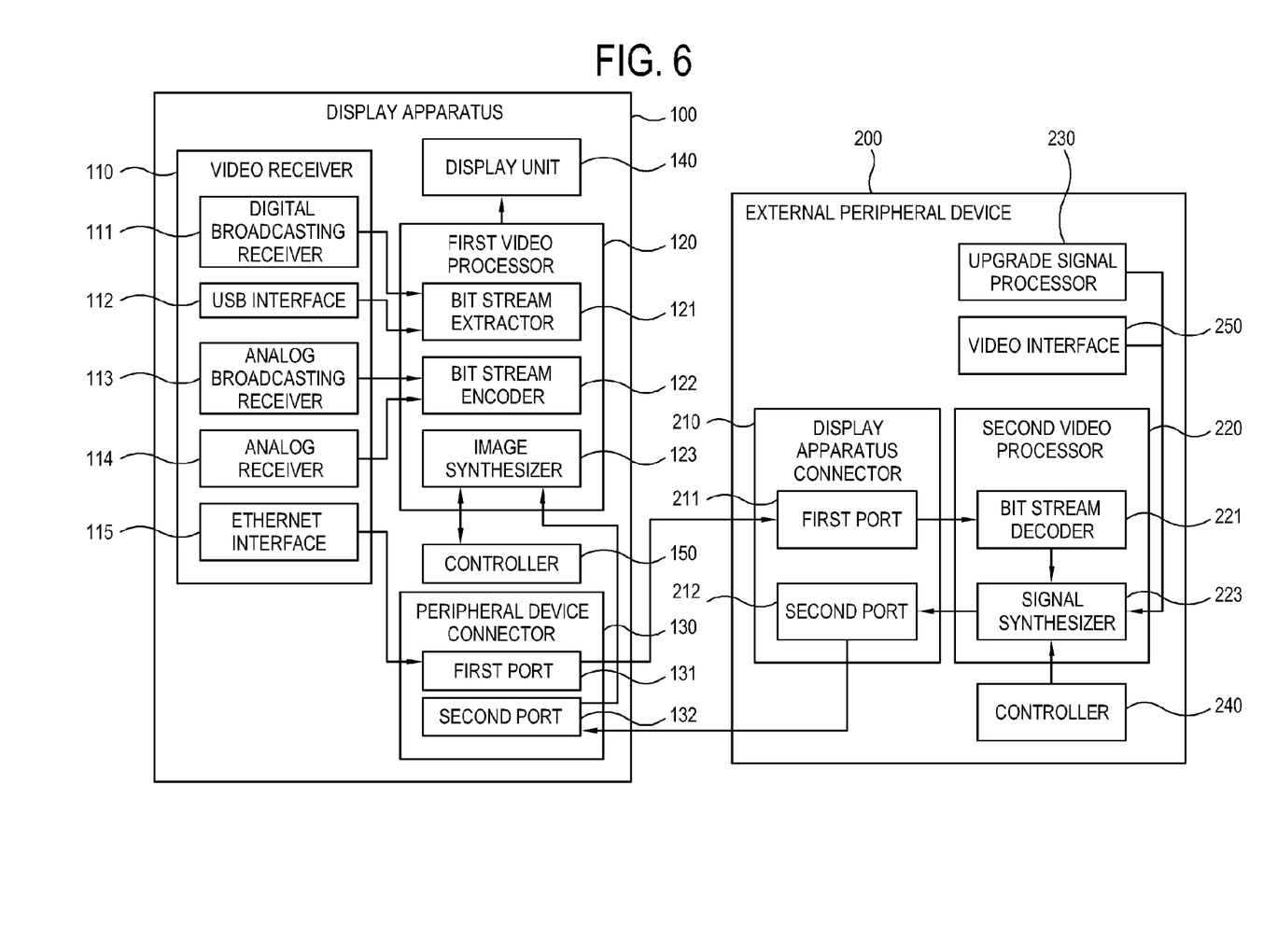
FIG. 6 is a control block diagram illustrating a display apparatus and an external peripheral device according to another exemplary embodiment.

FIG. 6 is a control block diagram illustrating a display apparatus and an external peripheral device according to another exemplary embodiment.

As shown therein, the external peripheral device 200 according to an exemplary embodiment further includes a video interface 250. Data which are transmitted to the video interface 250 include a raw digital video signal and may include a high definition digital signal such as an HD signal. The video interface 250 may include an HDMI interface to which a digital image source such as a set-top box or a blue ray disk may be connected.

In the case of a digital signal that is not compressed easily due to high definition of an image, the display apparatus 100 may receive not only a graphic signal but also a video signal from the external peripheral device 200. The external peripheral device 200 synthesizes a graphic signal to a digital video signal transmitted by the video interface 250 to provide the synthesized signal to the display apparatus 100.

Figure 7:
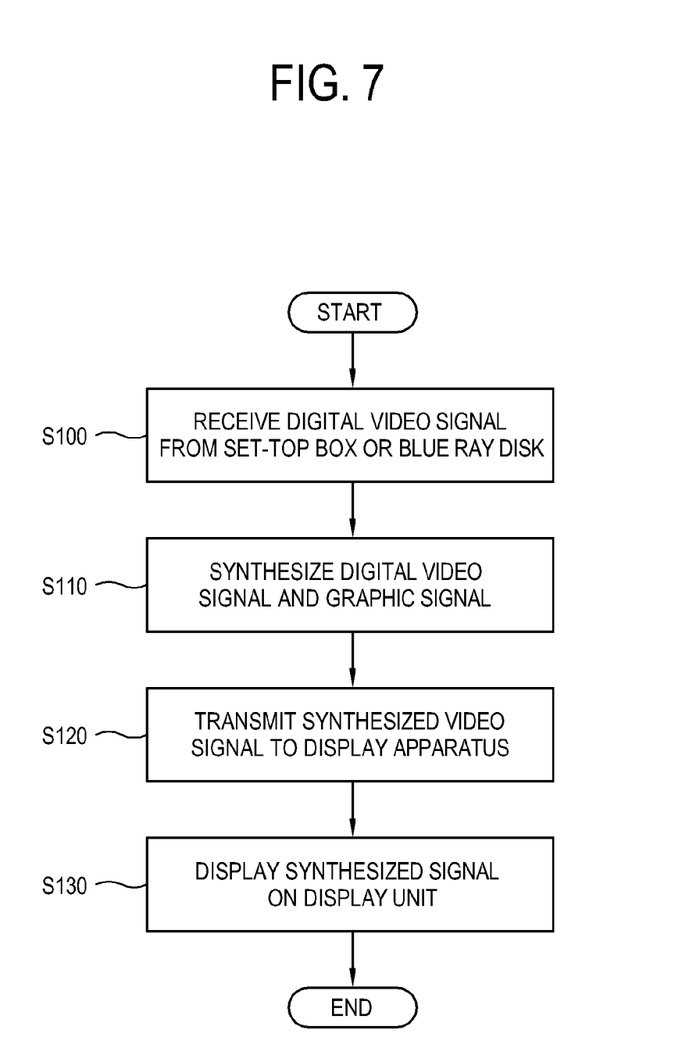
FIG. 7 is a control flowchart illustrating an image displaying method of a display apparatus and an external peripheral device according to an exemplary embodiment.

FIG. 7 is a control flowchart illustrating image display method provided by an image displaying apparatus of a display apparatus and an external peripheral device according to an exemplary embodiment will be described as follows.

The external peripheral device 200 receives a digital video signal from the digital video source such as a set-top box or a blue ray disk (in operation S100).

The received digital video signal is input to the signal synthesizer 223 to be synthesized with a graphic signal relating to contents of the digital video signal (in operation S110).

The synthesized video signal and graphic signal are transmitted to the display apparatus 200 (in operation S120), and are displayed on the display unit 140 (in operation S130).

As described above, a display apparatus and an image displaying method according to an exemplary embodiment displays a graphic signal which relates to contents of a video signal and overlaps the video signal and is displayed together with the video signal by using an external peripheral device.

Also, a display apparatus and an image displaying method according to an exemplary embodiment displays a graphic signal which relates to contents of a video signal, is displayed together with the video signal and overlaps the video signal by using an external peripheral device without modification of the hardware.

Further, an external peripheral device and an image processing method according to another exemplary embodiment synthesize an HD signal to a graphic signal for output.

Further, an external peripheral device and an image processing method according to another exemplary embodiment processes a video signal supplied by a display apparatus and transmits the processed video signal back to the display apparatus.

Although a few exemplary embodiments have been shown and described, it will be appreciated by those skilled in the art that changes may be made in these exemplary embodiments without departing from the principles and spirit of the invention, the range of which is defined in the appended claims and their equivalents. Some or all of the features of the different embodiments discussed above may be combined into a single embodiment. Conversely, some of the features of a single embodiment discussed above may be deleted from the embodiment.

What is claimed is:

1. A display apparatus comprising:
 a video receiver which receives a compressed video signal;
 a display unit;
 a connector which is connected to an external upgrade signal processing module; and
 a processor which transmits the compressed video signal to the external upgrade signal processing module such that the external upgrade signal processing module decompresses the compressed video signal, receives the decompressed video signal from the external upgrade signal processing module, generates a graphic signal related to the received decompressed video signal, synthesizes the decompressed video signal with the graphic signal to form a synthesis signal and controls the display to display an image based on the synthesis signal.

2. The display apparatus according to claim 1, wherein the connector comprises one of a USB interface and a PCI express interface, an HDMI and a DVI.

3. The display apparatus according to claim 1, wherein the video receiver comprises at least one of: a digital broadcasting receiver which receives a digital broadcasting signal, an analog broadcasting receiver which receives an analog broadcasting signal, an Ethernet interface, a digital video receiver which receives a digital video signal, an analog video receiver which receives an analog video signal, and a USB interface.

4. The display apparatus according to claim 1, wherein the video receiver comprises:
 an analog receiver which receives an analog video signal;
 a bit stream encoder which encodes the analog video signal into a digital video signal;
 a digital receiver which receives a digital video signal; and
 a bit stream extractor which extracts the bit stream of the digital video signal.

5. The display apparatus according to claim 1, wherein the processor is further configured to integrate the synthesized signal with at least one of channel information, a subtitle, and a teletext.

6. A display apparatus comprising:
 a video receiver which receives a compressed video signal;
 a display unit;

a connector which is connected to an external upgrade signal processing module;

a controller which controls the connector to output the compressed video signal to the external upgrade signal processing module and receive a synthesis signal from the external upgrade signal processing module and to display an image based on the synthesis signal on the display unit, wherein the compressed video signal is decompressed by the external upgrade signal processing module, wherein the synthesized signal is the decompressed video signal synthesized with a graphic signal that relates to contents of the decompressed video signal.

7. The display apparatus according to claim 6, wherein the external update signal processing module is configured to synthesize the synthesis signal and at least one of channel information, a subtitle, and a teletext.

8. The display apparatus according to claim 6, further comprising: an MPEG encoder which converts an analog broadcasting signal into a digital signal upon receiving the analog broadcasting signal from the video receiver, wherein the controller controls the connector to output the converted digital signal to the external upgrade signal processing module.

9. The display apparatus according to claim 6, wherein the video receiver comprises at least one of a digital broadcasting receiver which receives a digital broadcasting signal, an analog broadcasting receiver which receives an analog broadcasting signal, an Ethernet interface, a digital video receiver which receives a digital video signal, an analog receiver which receives an analog video signal, and a USB interface.

10. The display apparatus according to claim 6, wherein the connector: comprises a first port comprising one of a USB interface and a PCI express interface, and a second port comprising one of a high definition multimedia interface (HDMI) and a digital visual interface (DVI), and wherein a video signal which is compressed into a digital signal is transmitted to the external upgrade signal processing module via the first port, and a decompressed video signal is transmitted by the external upgrade signal processing module via the second port.

11. An image displaying method comprising:

receiving a compressed video signal by a display apparatus;

outputting the compressed video signal to an external upgrade signal processing module connected to the display apparatus;

decompressing the compressed video signal by a processor of the external upgrade signal processing module;

receiving by the display apparatus the decompressed signal from the external upgrade signal processing module;

generating a graphic signal related to the received decompressed video signal by a processor of the display apparatus;

synthesizing the decompressed video signal received from the external upgrade signal processing module with the graphic signal to form a synthesis signal by the processor of the display apparatus; and displaying an image based on the synthesis signal by the processor of the display apparatus.

12. The method according to claim 11, wherein the receiving the video signal comprises receiving at least one of a digital broadcasting signal, an analog broadcasting signal, a digital video signal, and an analog video signal.

13. The method according to claim 11, wherein the synthesis signal comprises another graphic signal received from the external upgrade signal processing module.

14. The method according to claim 11, wherein the receiving the video signal comprises receiving an analog broadcasting signal and wherein the method further comprises converting the analog broadcasting signal into a digital signal.

15. A display apparatus comprising:

a video receiver which receives a compressed video signal;

a display unit; and a connector which is connected to an external upgrade signal processing module; and a processor which transmits the compressed video signal to the external upgrade signal processing module such that the external upgrade signal processing module decompresses the compressed video signal, receives the decompressed video signal from the external upgrade signal processing module, generates a graphic signal related to the received decompressed video signal, synthesizes the decompressed video signal with the graphic signal to form a synthesis signal and controls the display to display an image based on the synthesis signal, wherein the external upgrade signal processing module which is connected to the display apparatus comprising:

a display apparatus connector which comprises a first port to receive a compressed video signal and a second port to transmit a decompressed video signal; and an enhanced processor which decompresses the compressed video signal received via the display apparatus connector.

16. The display apparatus according to claim 1, further comprising a video processor which extracts and encodes a bit stream of the video signal, wherein the upgrade signal processing module provides an enhanced processing of the bit stream in comparison with the video processor.

17. The display apparatus according to claim 16, wherein the video signal is a broadcast signal and wherein the external upgrade signal processing module searches Internet regarding information related to the broadcast signal and synthesizes the found information with the broadcast signal to form the synthesized signal.

18. The display apparatus according to claim 17, wherein the information comprises at least one of an advertisement, a program information, a survey, and stock information.

19. The display apparatus according to claim 1, wherein the external upgrade signal processing module comprises a scaler and at least one of a widget application or an on screen display generator application.

20. The display apparatus according to claim 1, wherein the external upgrade signal processing module generates a main image window for the video signal and a search window for the graphic signal and provides the synthesized signal comprising both windows.

21. The display apparatus according to claim 1, wherein the external upgrade signal processing module is configured to upgrade the video signal.

* * * * *